United States Patent [19]

Majeau et al.

[11] 3,909,534

[45] Sept. 30, 1975

[54] VOICE PRIVACY UNIT FOR INTERCOMMUNICATION SYSTEMS

[75] Inventors: Henrie L. Majeau, Bellevue; Roland O. Barnes, Federal Way; Robert G. Hove, Mercer Island; Abraham L. Angell, Jr., Renton, all of Wash.

[73] Assignee: The Boeing Company, Seattle, Wash.

[22] Filed: Nov. 12, 1973

[21] Appl. No.: 415,103

Related U.S. Application Data

[63] Continuation of Ser. No. 178,000, Sept. 7, 1973, abandoned.

[52] U.S. Cl....... 179/1.5 R; 178/69.5 R; 179/1.5 E; 325/32

[51] Int. Cl.$^2$ .......................................... H04K 1/02

[58] Field of Search.................. 178/22, 5.1, 69.5 R; 325/32, 58; 179/1.5 R; 340/147 SY

[56] References Cited

UNITED STATES PATENTS

| | | | |
|---|---|---|---|
| 3,435,141 | 3/1969 | Hileman et al. | 178/69.5 R |
| 3,624,297 | 11/1971 | Chapman | 179/1.5 R |
| 3,659,046 | 4/1972 | Angeleri et al. | 178/22 |
| 3,681,708 | 8/1972 | Olmstead | 178/22 |
| 3,694,757 | 9/1972 | Hanna, Jr. | 178/22 |
| 3,696,207 | 10/1972 | Lundin et al. | 178/22 |
| 3,723,878 | 3/1973 | Miller | 179/1.5 |

*Primary Examiner*—Maynard R. Wilbur
*Assistant Examiner*—H. A. Birmiel
*Attorney, Agent, or Firm*—Christensen, O'Connor, Garrison & Havelka

[57] ABSTRACT

A system for coding and decoding voice signals in an intercommunication system to prevent unauthorized recognition thereof comprises identical units placed at each station in the system. When a user at one station desires to communicate with a user at another station, the closure of his microphone press-to-talk switch energizes circuitry within his unit so that two low-frequency tones are transmitted therefrom. A predetermined time after the initiation of these two tones, the phase of one of the tones is reversed. Identical detectors within each unit develop a synchronizing pulse from the phase reversal which enables a pseudo-random frequency generator. In the transmitting unit, the set of pseudo-random frequencies comprising the output of the pseudo-random frequency generator is mixed with voice signals to provide a coded transmission signal. An identical pseudo-random frequency generator in each receiving unit also develops an identical set of pseudo-random frequencies in response to the synchronizing pulse which is used to decode the transmission signal. The transmitted voice signals are garbled and cannot be recognized by unauthorized parties.

15 Claims, 3 Drawing Figures

INVENTORS
HENRIE L. MAJEAU
ROLAND O. BARNES
ROBERT G. HOVE
BY Christensen & Sanborn
ATTORNEYS INVENTORS
HENRIE L. MAJEAU
ROLAND O. BARNES
ROBERT G. HOVE
BY Christensen & Sanborn
ATTORNEYS

VOICE PRIVACY UNIT FOR INTERCOMMUNICATION SYSTEMS

This is a continuation of application Ser. No. 178,000, filed Sept. 7, 1973, now abandoned.

FIELD OF THE INVENTION

This invention generally relates to voice intercommunication systems, and more particularly, to coder/decoder units for providing voice privacy within said systems.

BACKGROUND OF THE INVENTION

With the methods now available to many persons for access to two-way radio or other intercommunications, it has become increasingly desirable to provide some means for protecting the privacy of conversations. Standard telephone bandwidth channels, including mobile-to-base radio systems, which are used by police departments, fire departments, security agencies, and the like, have a particular need for voice privacy.

In the past, there have been many low-quality systems which have been proposed and which have been placed into practice which code or "scramble" voice signals transmitted over narrow-bandwidth channels of this type in order to attempt to block unauthorized access to voice conversations. In each case, suitable means must be provided at a receiving station for decoding or descrambling the voice signals. While the prior approaches have achieved a fair measure of success, they have in many instances been easy to compromise. In addition, they have not always provided high intelligibility of the received voice signals after decoding, nor have they normally provided both clear and coded modes of operation.

It is therefore an object of this invention to provide a voice privacy unit for intercommunication systems in which compromise by unauthorized parties of the voice transmission is improbable.

It is another object of this invention to provide such a voice privacy unit in which the received, decoded voice signals have high intelligibility and provide easy recognition of the speaker.

It is an object of this invention to provide a technique for accomplishing audio masking of voice communications which have been already encoded.

It is yet another object of this invention to provide such a voice privacy unit in which a large number of valid codes are available.

It is a further object of this invention to provide such a voice privacy unit in which both scrambling and unscrambling are automatically under control of the person initiating the conversation at the transmitter.

It is still a further object of this invention to provide such a voice privacy unit in which voice communications are possible notwithstanding a failure in a voice privacy unit.

It is yet another object of this invention to provide such a voice privacy unit which is easily adaptable for either portable or fixed use, and which is applicable to communication between selected units, between a selected unit and a fleet of such units, and so forth.

It is still another object of this invention to provide such a voice privacy unit which is simple of construction, low in cost, and easily installed in conjunction with existing narrow-bandwidth intercommunication systems.

It is yet a further object of this invention to provide such a voice privacy unit in which data signal transmission is squelched at all receiving stations but those able to decode the particular transmission being sent.

SUMMARY OF THE INVENTION

These objects and others which will be realized from the consideration of the specification are achieved, briefly, by transmitting a first pair of tones for masking a voice transmission which is to be coded, by detecting a modulation of these tones or of either tone at each transmitter and receiver and generating a synchronizing signal, by starting the operation of identical pseudo-random frequency generators in each transmitter and receiver in response to said synchronizing signal, and by mixing the output of said pseudo-random frequency generators with audio signals in each transmitter and receiver to respectively code and decode voice transmission between said transmitter and receivers.

BRIEF DESCRIPTION OF THE DRAWINGS

The invention can best be understood by reference to the following portion of the specification, taken in conjunction with the accompanying drawings in which.

DESCRIPTION OF A PREFERRED EMBODIMENT

Figure 1:
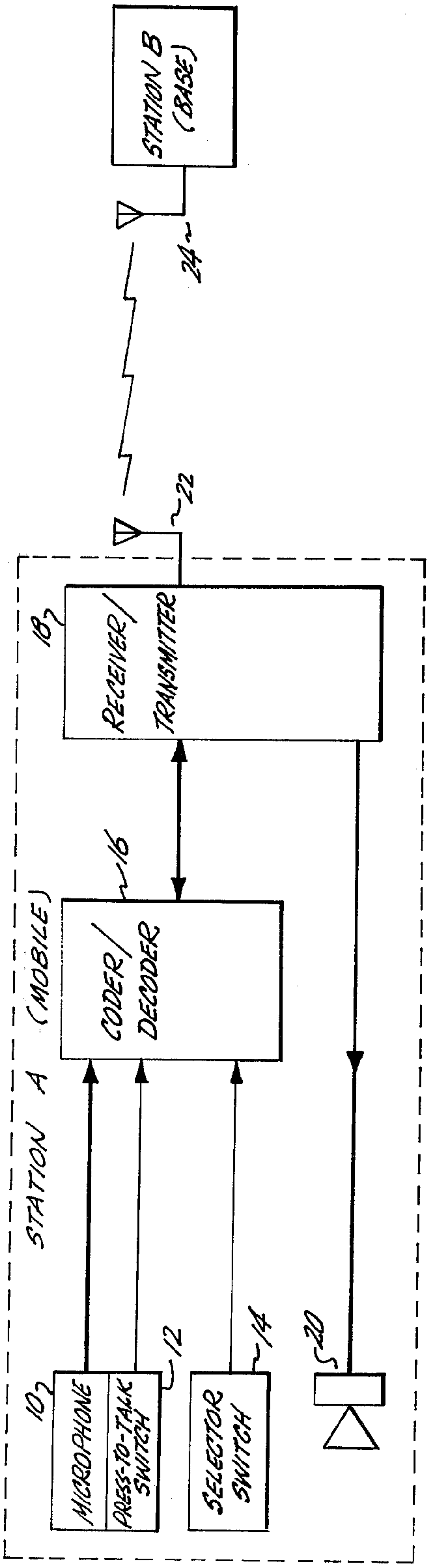
FIG. 1 is a block diagram of the voice privacy unit in combination with a typical mobile-base intercommunication system.

With reference now to FIG. 1, a two-way radio intercommunication system includes station A, which is a mobile unit, and station B, which is a centrally-located base unit. Since the stations are practically identical, only the elements of station A are shown. Included therein is a microphone 10 with an accompanying press-to-talk switch 12. Microphone 10 provides a voice input to a coder/decoder 16 and press-to-talk switch 12 provides a control input thereto. Coder/decoder 16 forms one portion of the voice privacy unit, as does a selector switch 14 which provides an additional control input thereto. In turn, coder/decoder 16 interfaces, through appropriate voice signal paths, a receiver/transmitter 18. Receiver/transmitter 18 provides an audio output to a loud-speaker 20 located in station A and has a radio frequency (RF) output and input coupled to an antenna 22 which exchanges RF signals with an antenna 24 of station B.

In normal applications, microphone 10 and press-to-talk switch 12 are connected directly to corresponding inputs of receiver/transmitter 18. Therefore, the installation of the voice privacy unit requires only connection to microphone 10 and press-to-talk switch 12 and to various points within receiver/transmitter 18, as explained in more detail with reference to the preferred embodiment of FIG. 2.

The selector switch 14 is operative to provide a control input only when the station A is being operated in a transmitting mode, and functions to control the supply of power to the receiver/transmitter 18, and additionally to determine whether the transmission is to be scrambled (coded) or without scrambling (clear).

Figure 2:
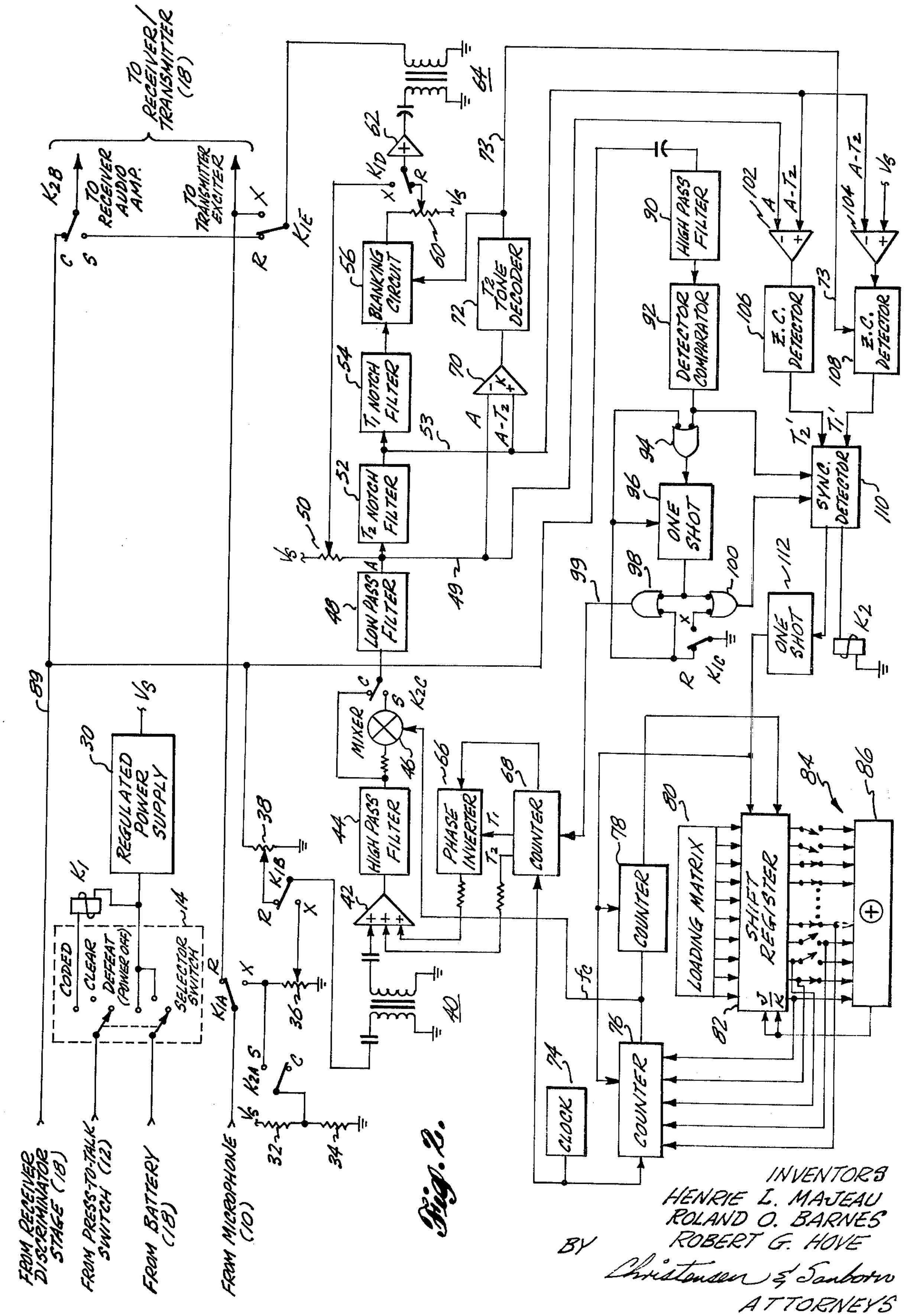
FIG. 2 is a combined schematic and block diagram of a preferred embodiment of the voice privacy unit.

With reference now to FIG. 2, the selector switch 14 is seen to comprise a three-position, double-pole switch which has signals from the press-to-talk switch 12 and from a DC battery contained within the receiver/transmitter 18 connected to its inputs. In the first or DEFEAT position, the input terminals are disconnected from the circuitry of the unit so as to inhibit any operation thereof. In the second or CLEAR position, connection is made from the battery to the input of a regulated power supply 30 which provides, in response thereto, a regulated supply voltage $V_S$. The DC voltage from the battery 18 is also supplied to one side of a transmit/receive relay $K_1$. However, when selector switch 14 is in the CLEAR position, no connection can be made to the other side of the coil of relay $K_1$ and therefore relay $K_1$ remains de-actuated.

Relay $K_1$ has a plurality of contact sets $K_{1A}$, $K_{1B}$, etc. When relay $K_1$ is de-actuated, the movable contact arm of each of its contact sets $K_{1A}$, $K_{1B}$, etc., is engaged with a stationary contact R thereof, and when relay $K_1$ is actuated, the movable contact arm of each of its contact sets $K_{1A}$, $K_{1B}$, etc., engages a stationary contact X thereof.

The CLEAR or unscrambled mode of operation of the voice privacy unit will now become evident from a consideration of FIG. 2. Assuming first that the unit illustrated is included within station A, the depression of the press-to-talk switch 12 causes a bias voltage to be applied to the microphone 10 by means not illustrated. Accordingly, voice signals are produced in response to the speech of the person initiating transmission and coupled from the microphone 10 through the relay contact set $K_{1A}$, in position R, directly to the exciter of the receiver/transmitter 18 within station A where the signals are therein modulated upon a suitable RF carrier and transmitted via antenna 22 to antenna 24.

Assuming now that the unit in FIG. 2 is installed in the base station B, the RF signal is detected and demodulated. The voice signals are then coupled from the receiver's discriminator stage to line 89. (FIG. 2) Thereafter, these signals are coupled to the stationary contact C of a contact set $K_{2B}$, of a relay $K_2$, and to an audio amplifier for audible reproduction. Relay $K_2$ comprises a clear/scramble relay having a plurality of contact sets $K_{2A}$, $K_{2B}$, etc. Each of the contact sets includes a movable contact arm and stationary contacts C and S. Normally, relay $K_2$ is de-actuated and the movable contact arm is engaged with stationary contact C thereof.

Therefore, when selector switch 14 is in the second or CLEAR position, coder/decoder 16 is by-passed in both the transmitting and receiving stations. Therefore, if coder/decoder 16 happens to fail during operation, communications between stations are not impeded in any manner because of this normal bypass.

When a scrambled voice transmission is required, the user at the transmitting station places his selector switch 14 in the third or CODED position. At this time, the depression of the user's press-to-talk switch 12 provides a path to ground for the other side of the coil of relay $K_1$, thereby causing its actuation. In response, the movable contact arms in the contact sets $K_{1A}$, $K_{1B}$, etc., move into engagement with the X stationary contacts thereof.

When contacts $K_{1C}$ move to position X, a logic 0 is removed from the R terminal thereof which is connected to one input of a NOR gate 94, a one-shot multivibrator 96, and a NAND gate 98. In response, the NOR gate 94 is inhibited from further operation, one-shot multivibrator 96 begins its timing period, and NAND gate 98 is enabled to supply an enabling pulse to a counter 68. The input to counter 68 is supplied with relatively high frequency clock pulses from a clock 74. In one embodiment, those pulses had a frequency of 1 MHz. When multivibrator 96 provides an output pulse at the end of its timing period, an enabling pulse is supplied to counter 68 through NAND gate 98 and lead 99. The time delay of one-shot multivibrator 96 may be appropriately chosen to provide a time spacing for the transmission and reception of various other identification codes, by means not shown, in order to provide for fleet addressing. In one embodiment, the delay comprised 0.8 seconds. In response to the enabling pulse on lead 99, counter 68 counts down and develops two tones $T_1$, $T_2$. In a preferred embodiment, $T_1$ and $T_2$ are square waves both in the audio range of frequencies, and $T_1 = 2T_2$. For example, $T_1 = 1953$ HZ and $T_2 = 976$ HZ.

The tones $T_1$ and $T_2$ are used in the transmitter and each receiver to develop a synchronizing pulse for starting the coding sequence and to mask the coded voice communications. The tone $T_1$ is supplied to one input of a summing amplifier 42 through a phase inverter 66, and the tone $T_2$ is supplied directly to another input of summing amplifier 42. A third input to amplifier 42 is provided from the microphone 10 through contacts $K_{1A}$, in position X, a potentiometer 36, contacts $K_{1B}$, in position X, and an input coupling transformer 40. However, since microphone 10 is no longer directly connected to the transmitter exciter through contacts $K_{1A}$, in position R, there is no bias thereon so that no voice signals are produced in response to speech of the user.

The output of operational amplifier 42 is supplied to a high pass filter 44 which removes all low frequency noise. In one embodiment, the cut-off frequency of filter 44 was 300 Hz. The output of filter 44 is then coupled to the input of a low pass filter 48 through contacts $K_{2C}$, in position C. In one embodiment, the cut-off frequency of filter 48 was 3 KHz. The output of low pass filter 48, designated A, is applied to the input of a $T_2$ notch filter 52, to the negative input of a differential amplifier 70, and to the negative input of a differential amplifier 102. The signal A is also applied through a potentiometer 50, contact set $K_{1D}$, in position X, and amplifier 62, a coupling network 64, and a contact set $K_{1E}$, in position X, to the transmitter exciter. Therefore, both $T_1$ and $T_2$ are modulated onto the RF carrier and transmitted to base station B.

In the transmitting unit, the output of notch filter 52 is supplied to the positive input of differential amplifier 70 and comprises a signal A-$T_2$. In the embodiment noted, the notch frequency equaled 976 HZ, or $T_2$. The output of differential amplifier 70 is supplied to the input of a $T_2$ tone decoder 72. The combination of amplifier 70 and decoder 72 functions to provide an output signal only if the tone $T_2$ is present for a given portion of the total time that the signal A is present. In this manner, false operation of the unit in response to only one of the tones, plus noise, can be avoided.

Both the signals A and A-$T_2$ are supplied to differential amplifier 102, and the signal A-$T_2$ and a constant signal from the supply voltage $V_S$ are supplied to a differential amplifier 104. The output of differential amplifier 102 is coupled to a zero crossing detector 106, and the output of differential amplifier 104 is coupled to a zero crossing detector 108. The function of these elements is to remove all components of the signals but those corresponding to tones $T_2$ and $T_1$, and to reproduce square waves $T_2'$, $T_1'$, whose frequencies are identical to that of the tones $T_2$ and $T_1$. It should be noted that zero crossing detector 108 is not enabled unless an output signal has been previously applied by $T_2$ tone decoder 72 on a line 73.

Figure 3:
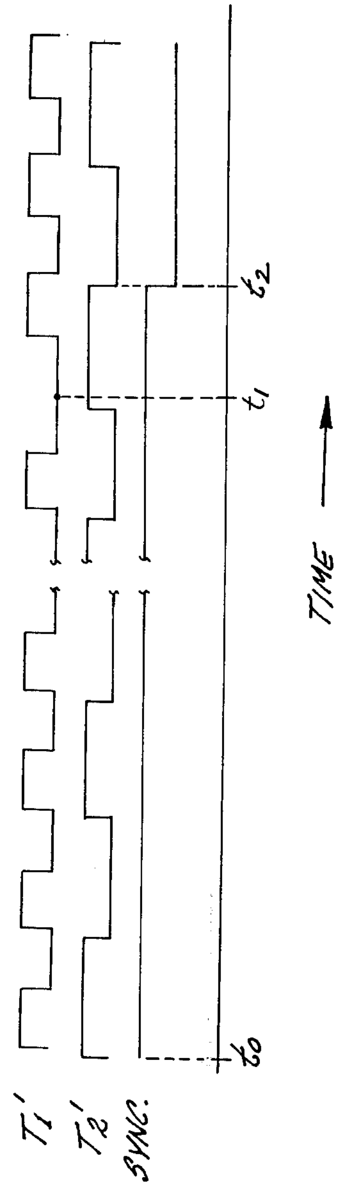
FIG. 3 is a timing chart illustrating the operation of the synchronizing signal detector in FIG. 2.

The signals $T_1'$ and $T_2'$ are supplied to two inputs of a synchronizing detector 110. As long as $T_1'$ and $T_2'$ have a predetermined phase relationship, as best seen in the portion of FIG. 3 from time $t_0$ to $t_1$, the output of detector 110 is a logic 0.

At a predetermined time after the contacts $K_{1C}$ have been placed in position X, an internal counter within counter 68 provides an output to phase inverter 66 so that the phase of the tone $T_1$ is inverted 180° at the next change in logic state thereof. This inversion is seen in FIG. 3 as occurring at time $t_1$. The phase inversion of $T_1$ is coupled through amplifier 42, filters 44 and 48, notch filter 52, amplifier 104, and zero crossing detector 108, and is reflected in the wave form $T_1'$. At the next change in state of the wave form $T_2'$, synchronizing detector 110 senses the phase inversion and provides an output synchronizing signal to both a one-shot multivibrator 112 and to the coil of relay $K_2$.

Although the synchronizing event has been described in terms of a change in predetermined phase relationship of the tones $T_1$ and $T_2$, this event could also comprise any modulation of either tone or of both tones.

After a short period of time, the one-shot multivibrator 112 provides an output signal to initiate operation of a pseudo-random frequency generator.

The generator includes a variable modulus counter 76, a fixed modulus counter 78, a loading matrix 80, a shift register 82, a plurality of feedback switches 84, and an exclusive-OR circuit 86. This generator is described in more detail in a copending patent application entitled "Pseudo-Random Frequency Generator," by Henri L. Majeau and Kermit Thompson, which is also assigned to the assignee of the present invention.

The output signal from one-shot multivibrator 112 is applied as an initialize signal to reset counters 76 and 78, and to transfer a preset digital number from loading matrix 80 into a predetermined number of stages of shift register 82. In detail, loading matrix 80 includes a plurality of output terminals, one for each stage of shift register 82. The signals on a predetermined number of these output terminals are fixed at either a logic 1 or logic 0 state, while the signals of the remaining output terminals are switchable between logic 1 and logic 0. By appropriate manipulation of these switches, not shown, the user can preset the digital number that is loaded into shift register 82 at the beginning of operation of the pseudo-random frequency generator. In other words, the shift register 82 always has the same digital word contained therein at the start of its operation.

A predetermined number of the output terminals from shift register 82 are connected directly to the inputs of counter 76. In the embodiment shown in FIG. 2, the contents of the first five stages of shift register 82 are coupled to counter 76 so that the bits which have been loaded therein by loading matrix 80 are automatically transferred to and loaded in counter 76, in order to preset the modulus thereof.

At the start of operation, counter 76 therefore produces an output pulse for a predetermined number of input pulses thereto. These input pulses are supplied from clock 74. As indicated, clock 74 in one embodiment had a frequency of 1 MHz. It may be assumed for purposes of discussion that counter 76 is preset to initially provide output pulses at a frequency of 3,000 Hz.

The output of counter 76 is supplied directly to the input of fixed modulus counter 78 which produces clocking pulses at a much lower frequency; for example, the frequency of the clocking pulses in the abovementioned example may be 50 Hz.

These clocking pulses are supplied directly to the clock input of shift register 82. In response to the first clocking pulse, the digital word in shift register 82 is shifted one stage to the right. At the same time, a new bit is entered into the first stage of shift register 82. This new bit is obtained from the combination of feedback switches 84 and exclusive-OR circuit 86. In detail, selective closure of the feedback switches 84 determine which of the stages of shift register 82 are to be compared in exclusive-OR circuit 86.

Exclusive-OR circuit 86 is commercially available, and its operation may be visualized by considering the comparison made in a two-terminal exclusive-OR gate. If both inputs to an exclusive-OR gate are logic 1 or logic 0, the output thereof is a logic 0, whereas if either input is a logic 0 and the other is a logic 1, the output is a logic 1. Accordingly, exclusive-OR gate feeds a logic 1 or a logic 0 into the first stage of shift register 82 with each clocking pulse from counter 78, and the digital word contained in shift register 82 is changed. The sequence of changing is predetermined by (a) the preset digital word and (b) the setting of feedback switches 84.

Since the first five stages of shift register 82 are coupled to the inputs of counter 76, the modulus of counter 76 is also changed for every clocking pulse from counter 78. Since counter 78 has a fixed modulus, the period of the new clocking pulse therefrom is different from that immediately preceding so that the time period during which the second set of pulses from counter 76 is produced is different from the time period during which the initial set of pulses was produced.

When counter 78 provides its next clocking pulse, the contents of shift register 82 are again shifted one stage to the right, and a new bit entered into the first stage from exclusive-OR circuit 86, in accordance with the shifted contents of the shift register 82 and the positions of feedback switches 84. As before, the modulus of counter 76 is again changed to produce a new output frequency therefrom.

The output frequency from counter 76, or $f_c$, varies in a pseudo-random fashion and steps from one value to another in response to each clocking pulse from counter 78. The value of the frequency is determined by the digital word contained in those stages of shift register 82 that are connected to the inputs of counter 76. The length of time that any one frequency $f_c$ is produced is also variable, because of the fact that the clocking pulses used to step from a first frequency to another are developed from the first frequency by fixed-modulus counter 78.

If the number established by loading matrix 80 and the position of feedback switches 84 are identical in two voice privacy units, the nearly simultaneous initialization thereof provides the ability to code and decode voice signals by appropriate mixing, because both sequences of frequencies $f_c$ proceed in an indentical pseudo-random manner. As described in the aforementioned copending application, a generator of this type provides a large number of valid codes or pseudo-random sequences which makes compromise especially difficult and which allows differently-coded communications among a large number of separate stations.

The output frequency $f_c$ is coupled to one input of a mixer 46. The actuation of relay $K_2$ causes the movable contact arms in its contact sets $K_{2A}$, $K_{2B}$, etc., to engage the stationary contact S thereof. Accordingly, bias voltage is applied to the microphone 10 through the contact sets $K_{2A}$ and $K_{1A}$, in positions S and X, respectively, from a voltage divider including resistors 32 and 34 connected between $V_S$ and ground potential. Voice signals from the microphone are coupled to the input of amplifier 42 through contact set $K_{1A}$, in position X, contact set $K_{1B}$, in position X, and potentiometer 36, transformer 40. The actuation of relay $K_2$ places mixer 46 in the output signal path from amplifier 42 and filter 44 so that the output of mixer 46 comprises the sum and difference components of the voice signals and the frequency $f_c$. The upper sideband is filtered out in low pass filter 48. The resultant signal is scrambled beyond recognition and is coupled to the transmitter exciter through potentiometer 50, contact set $K_{1D}$, in position X, amplifier 62, coupling circuit 64, and contact set $K_{1E}$, in position X.

When the RF signal is received at station B, it is demodulated and supplied to line 89, in FIG. 2. Assuming now that the unit in FIG. 2 is located at the receiving base station B, the signals on line 89 are coupled to the input of a high pass filter 90 and a one side of a potentiometer 38. High pass filter 90 removes all signals but those noise signals normally present when a carrier is not being detected by the receiver portion of the local receiver/transmitter 18. In one embodiment, the cut-off frequency of filter 90 was 6 KHz. A detector comparator 92 coupled to the output of filter 90 is energized to provide logic 0 output signal only if the signal on line 89 is accompanied by RF carrier components and an absence of noise signals. At the station B, relay $K_1$ is de-actuated so that the contact sets $K_{1A}$, $K_{1B}$, etc., are in the R position. Accordingly, a logic 0 is applied to the other input of NOR gate 94 from contact set $K_{1C}$, in position R. The concurrence of a logic 0 output from detector comparator 92 at the other input of NOR gate 94 provides a logic 1 output which triggers one-shot multivibrator 96.

Therefore, when the transmitting station begins transmission of a carrier in response to the depression of the press-to-talk switch 12, the detector thereof enables one-shot multivibrator 96. After a predetermined time period, in the above example 0.8 seconds, one-shot multivibrator 96 provides an output pulse which is gated through a NAND gate 100 to inhibit synchronizing detector 110. The time period of multivibrator 96 therefore sets a "window" during which synchronizing detector 110 is enabled.

The voice signals on line 89 are also coupled through potentiometer 38, contact set $K_{1B}$, in position R, and input transformer 40 to amplifier 42. Since counter 68 has not been enabled, no signals are applied to the other inputs of amplifier 42. After passing through high pass filter 44, contact set $K_{2C}$, in position C, and low pass filter 48, the received signal, containing the tones $T_1$ and $T_2$, appears as signal A and is applied thereafter to notch filter 52, differential amplifier 70, and differential amplifier 102.

The further operation of the synchronizing circuitry in this receiver unit is similar to that at the transmitter. Upon the phase reversal of the tone $T_1'$, synchronizing detector 110 provides an output signal which actuates one-shot multivibrator 112 and relay $K_2$. The operation of the pseudo-random frequency generator in the receiver is synchronized with the operation of the pseudo-random frequency generator in the transmitter. The output $f_c$ is applied to mixer 46. When relay $K_2$ is actuated, descrambling is effected of the transmitted voice signals in mixer 46. The output is coupled through low pass filter 48 to notch filter 52, where the tone $T_2$ is removed, and thence to a notch filter 54, where the tone $T_1$ is removed. The output of notch filter 54 is coupled to a blanking circuit 56. Normally, blanking circuit 56 blocks signals on its input from appearing at its output, and is inhibited only when an output signal is provided by $T_2$ tone decoder 72. The output of blanking circuit 56 is coupled through potentiometer 60, contact set $K_{1D}$, in position R, amplifier 62, coupling network 64, contact set $K_{1E}$, in position R, and contact set $K_{2B}$, in position S, to the receiver's audio amplifier for audio reproduction.

Because of transmission delays, synchronizing detector 110 may include a time delay means responsive to the signal from gate 100 which slightly extends the window during which detector 110 is enabled while its accompanying unit is in the receiving mode. If a carrier is not detected by high pass filter 90 and detector comparator 92, a logic 1 output thereof inhibits detector 110 and multivibrator 96 from operation.

Selection of those units responsive to a scrambled communication can be made by appropriately choosing the tones $T_1$ and $T_2$ and by placing corresponding notch filters on each unit which is to respond. Those units not set for the particular $T_1$ and $T_2$ tones being transmitted will not respond; in addition, blanking circuit 56 will squelch any received tones from the receiver's audio circuits.

Because the component parts of the units in the transmitting and receiving stations are identical, and because the signal paths in both coding and decoding operations are similar and responsive to the same synchronizing event, the apparatus provides a high degree of intelligibility for voice signals when transmission is made in the scrambled mode. Finally, the arrangement including relay $K_1$ allows the person initiating the transmission to decide whether the transmission is to be scrambled or clear.

What is claimed is:

1. An apparatus for coding audio signals which are present in a unit of an intercommunication system to prevent unauthorized voice recognition thereof, comprising:

a. means for providing a coding signal when the audio signals are to be coded;

b. a first frequency generator means for producing, in response to said coding signal, a first signal having a frequency $f_1$ and a second signal having a frequency $f_2$;

c. a control means which is coupled to said first frequency generator means for causing a shift in the relative phasing of said first and said second signals to occur at a predetermined time after production of said coding signal;

d. detecting means having said first and said second signals coupled thereto and including a phase detecting means responsive to said shift in the relative phasing of said first and said second signals for providing a synchronizing signal;

e. a second frequency generator means capable of providing an output signal whose frequency $f_c$ varies in a pseudo-random sequence;

f. means starting said second frequency generator means at a predetermined point in said pseudo-random sequence in response to said synchronizing signal; and, g. means mixing said output signal with the audio signals.

2. An apparatus as recited in claim 1, wherein said phase-shifting means comprises a phase inverter which is operable to invert the phase of said first signal in response to a control signal, and timing means operable to provide said control signal at a predetermined time after production of said coding signal.

3. An apparatus as recited in claim 1, wherein the frequencies $f_1$ and $f_2$ are in the audio range so as to aid in masking the audio signals, wherein $f_1 = 2f_2$, and further including means summing said first and second signals with the audio signals.

4. An apparatus for coding or decoding audio signals which are present in a unit of an intercommunication system to prevent unauthorized voice recognition thereof, comprising:

a. means for providing a coding signal when the audio signals are to be coded;

b. first frequency generator means for producing, in response to said coding signal, a first signal having a frequency $f_1$;

c. a control means which is coupled to said first frequency generator means for causing a modulation of said first signal to occur at a predetermined time after production of said coding signal;

d. means summing said first signal with the audio signals;

e. detecting means having the output of said summing means coupled thereto, said detecting means being responsive to said modulation for providing a synchronizing signal;

f. a second frequency generator means capable of providing an output signal whose frequency $f_c$ varies in a pseudo-random sequence;

g. means starting said second frequency generator means at a predetermined point in said pseudo-random sequence in response to said synchronizing signal;

h. means mixing said output signal with the audio signals;

i. circuit means coupled to the unit which is placed in first or second states corresponding to the operation of the unit in transmit or receive modes; and, j. means responsive to said first and second states of said circuit means for enabling and disabling said first generator means and said control means.

5. An apparatus as recited in claim 4, wherein said detecting means includes means extracting said first signal from the signals present at the output of said summing means, and means responsive to a modulation of said extracted first signal for providing said synchronizing signal.

6. An apparatus as recited in claim 5, wherein said first frequency generator means produces, in response to actuation of the unit, a second signal having a frequency $f_2$, and further including means summing said second signal with said first signal and said audio signals, and wherein said detecting means further includes means extracting said second signal, wherein said modulation is a shift in the relative phasing of said first and second signals, and wherein said control means comprises a phase inverter operable to invert the phase of said first signal in response to a control signal, and a timing means operable to provide said control signal at a predetermined time after production of said coding signal.

7. The apparatus as recited in claim 6, wherein said detecting means further includes synchronizing detecting means providing said synchronizing signal at the next change in state of said extracted second signal after the phase inversion of said extracted first signal.

8. The apparatus as recited in claim 6, further including decoding means having coupled thereto the signals appearing on the output of said summing means and one of said extracted first or second signals and operative to provide an inhibit signal if said extracted signal is not included in said signals on said output for a predetermined duty cycle thereof, and means responsive to said inhibit signal to block operation of said detecting means.

9. The apparatus as recited in claim 8, further comprising means blanking the signals on the output of said summing means in response to said inhibit signal.

10. The apparatus as recited in claim 4, further comprising carrier detection means which is enabled when said circuit means is in said second state to provide a carrier output signal only when a predetermined set of frequencies is present in the audio signals, and means responsive to said carrier output signal for inhibiting said detecting means.

11. A system for providing coded communication between transmitting and receiving locations, comprising:

a. at the transmitting location, a source of voice signals, a first switching means which is actuated by a user desiring to transmit said voice signals, timing means producing a timing signal at a predetermined time after the actuation of said first switching means, a frequency generator for producing, in response to said timing signal, first and second signals having frequencies within the audio range of frequencies, means adding said first and said second signals to said voice signals, signal transmission means, means coupling the output of said adding means to said signal transmission means, means modulating said first signal, a first pseudorandom frequency generator providing an output whose frequency varies in a pseudorandom sequence, detecting means coupled to said first and said second signals for providing a synchronizing signal in response to said modulation, mixing means for modulating the output of said first pseudorandom frequency generator with the output of said adding means, and second switch means responsive to said synchronizing signal for starting said first pseudorandom frequency generator at a particular point in said pseudorandom sequence and enabling said mixing means;

b. at the receiving location, a receiving means for detecting the output of said signal transmission means and removing audio signals therefrom, filter means for extracting components from said audio signals which correspond to the frequencies of said first and said second signals, a second detecting means for providing a second synchronizing signal in response to said modulation, a second pseudorandom frequency generator providing an output whose frequency varies in a pseudorandom sequence identical to the pseudorandom sequence of said first pseudorandom frequency generator, second mixing means for modulating the output of said second pseudorandom frequency generator with said audio signals, means starting said second pseudorandom frequency generator and enabling said mixing means in response to said second synchronizing signal, and means converting the signals at the output of said second mixing means into audible frequencies.

12. A system as recited in claim 11, wherein said filter means at said receiving location is connected between the output of said second mixing means and the input of said signal converting means, and further including means connected to said filter means for blocking the output thereof from the input of said signal converting means if the frequency components of said audio signals which correspond to the frequency of said second signal do not have a minimum duty cycle with respect to said audio signals.

13. A system as recited in claim 12, further including means blocking the operation of said second detecting means in response to the operation of said blocking means.

14. A system as recited in claim 11, further comprising a carrier detection means located at said receiving location, said carrier detection means including a high-pass filter having said audio signals coupled thereto, and a detector comparator which is connected to the output of said high-pass filter for enabling said second detecting means if a predetermined frequency spectrum is absent from said audio signals for a predetermined period of time.

15. A system as recited in claim 11, further comprising means for providing alternative, uncoded voice transmission, said means including third switching means at said transmitting location for coupling said voice signals directly to said signal transmission means.

* * * * *